Patented Mar. 22, 1949

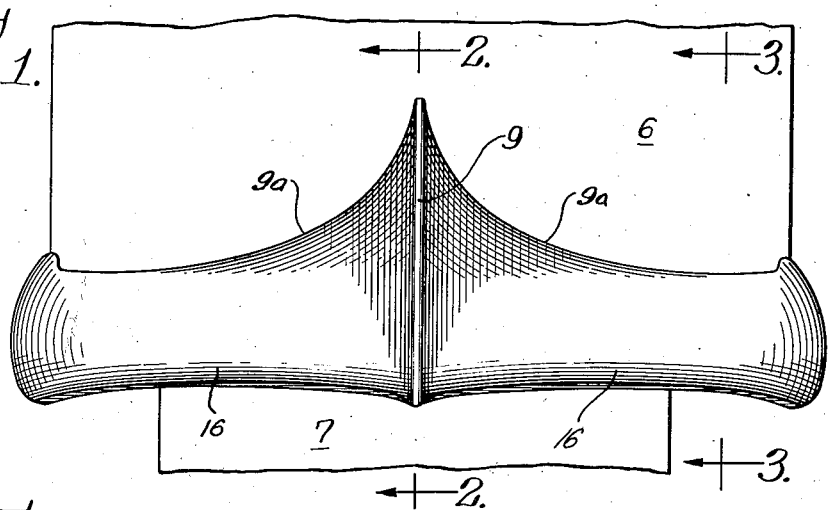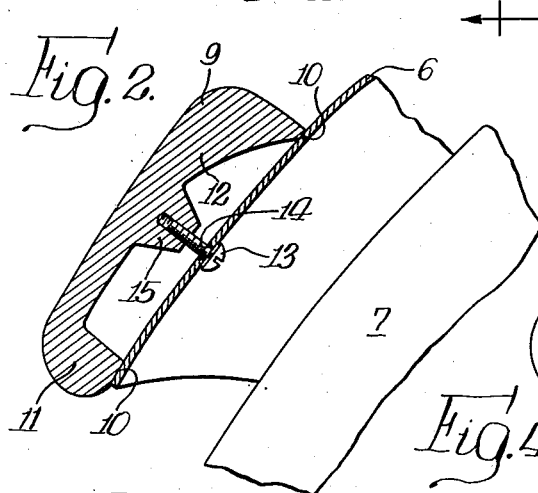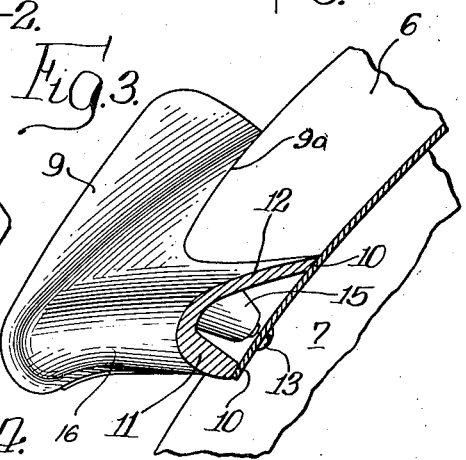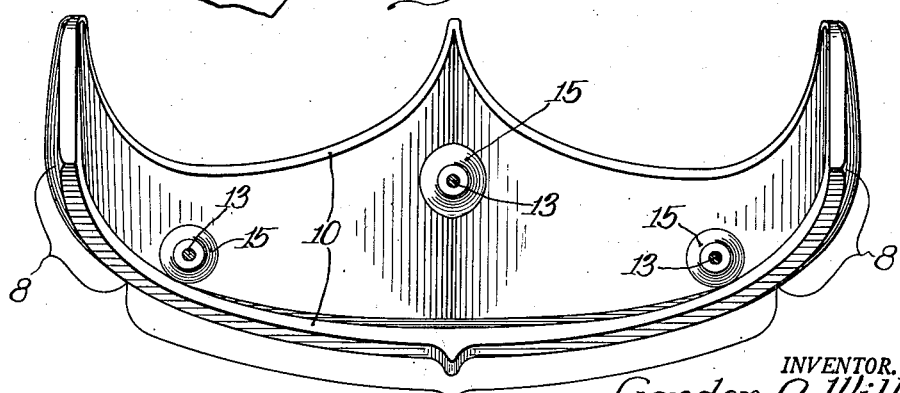

2,464,955

UNITED STATES PATENT OFFICE 2,464,955

CYCLE FENDER GUARD

Gordon A. Willey, Maywood, Ill.

Application November 12, 1946, Serial No. 709,299

3 Claims. (Cl. 280—152.1)

The invention relates to a guard or ornament for the fender of a cycle or the like and has as a general object to provide a guard of new and improved construction.

In the past the guards have been secured through the medium of bolts or screws passing from the outside through holes in the guard, thus leaving unsightly holes and screw or bolt heads marring an otherwise uninterrupted plated surface. The guards, moreover, have been formed so that the inside has presented a flat or flush surface. As a consequence, if the fender at the area over which the guard was applied did not conform truly throughout that entire area to the surface of the guard and, particularly, if there were bumps or other outward disfigurations of the fender, the guard did not lie close to the fender throughout the periphery of the guard, this not only presented an unsightly appearance but induced rattling noises and also induced noises created by the passage of air between the guard and the fender when the cycle was being driven.

It is an object of this invention, therefore, to provide a fender guard which has means located on the interior of the guard by which the guard is secured to the fender so as to leave the external plated surface completely free and devoid of any holes, screw or bolt heads, or other attaching and securing means to mar the appearance of the guard.

Another object of the invention is to construct the guard so that there is a degree of tension on the particular part of the fender to which the guard is secured, thereby causing the guard to be tightly held in contact with the fender and thus held against rattling even with flexing or vibration or jarring of the fender that may occur during use of the cycle.

Still another object is to provide a fender guard having such shape and such securing means that the peripheral edge only of the guard engages the fender with the securing being effected inwardly of such peripheral edge so as to attain a desired mounting.

Other objects and advantages will become apparent from the following detailed description taken in connection with the accompanying drawings, in which:

Fig. 1 is a front elevational view of a guard constructed in accordance with my invention mounted on a cycle fender.

Fig. 2 is a transverse sectional view taken approximately along the line 2—2 of Fig. 1.

Fig. 3 is a transverse sectional view taken approximately along the line 3—3 of Fig. 1.

Fig. 4 is an elevational view of the inner side of the guard of Fig. 1.

While the invention is susceptible of various modifications and alternative constructions, it is shown in the drawings and will hereinafter be described in a preferred embodiment. It is not intended, however, that the invention is to be limited thereby to the specific construction disclosed. On the contrary it is intended to cover all modifications and alternative constructions falling within the spirit and scope of the invention as defined in the appended claims.

As shown in the drawing for purposes of disclosure, the guard is a one-piece, generally elongated, plate-like member adapted to be secured to the end of a cycle fender so as to protect as well as to ornament the most exposed portion of the fender. The member has, as seen in the drawing, an intermediate portion 5 adapted when the guard is mounted on the fender to extend generally transversely of the fender represented at 6 in Figs. 1 to 3. The reference character 7 designates the tire of a wheel with which the fender guard is associated. At each end the member has portions, generally designated 8, which curve to extend generally laterally of the intermediate portion 5 and circumferentially along the side edge of the fender 6. At its midpoint, the member is formed on its exposed or exterior face or surface with a rib 9 which also extends definitely transversely of the intermediate portion, as seen in Fig. 1. As best seen in Fig. 3, the rib 9 extends downwardly and around the leading edge of the member at which point it projects from the surrounding member only a small distance but continues to become more and more pronounced as one progresses around the leading edge of the member and upwardly as viewed in that figure. The lateral dimension of the rib 9 is considerably greater than the average lateral dimension of the member proper and thus forms an upwardly and rearwardly directed rib or backbone serving in conjunction with the laterally projecting end portions 8 to give to the trailing edge 9a of the member a scalloped appearance.

As above stated, the guard is intended to be mounted on the end or tip of the fender 6. Unless the guard is applied at the factory, the fender 6 is likely to have received some dents or bulges or other irregularities which interfere with the mounting of customary cycle guards. Or if the irregularities of the fender do not prevent the mounting of the guard, the guard is nevertheless likely to rattle due to the great vibration to which the end of the fender is subject, or it is likely not to fit tightly against the fender thus permitting the air finding its way between the guard and the fender, when the cycle is moving, to set up whistling noises. It is to overcome these difficulties of past constructions that the guard herein is given a unique construction which not only adapts the guard for improved mounting but also enables the guard to be given a more sturdy appearance and construction without at the same time having greatly increased weight. To that end, the member is made hollow on the inner side. This hollow inner side reduces the weight of the guard and above all, by the provision thereof, provides a peripheral and protruding edge or marginal surface 10 having engagement, as clearly seen in Figs. 2 and 3, with the fender 6. To the end of producing this peripheral flange, the member, as best seen in Fig. 3, is given a nonsymmetrical V-shape in transverse cross section with one arm of the V formed by an inwardly extending flange 11 substantially perpendicular to the fender when mounted thereon and the other arm of the V formed by a sharply rearwardly and slightly upwardly extending portion 12. Of the same general construction is the mid portion of the plate, though the V that is formed is even more nonsymmetrical because of the extension of the rib 9.

The plate is adapted to be secured by means of screws 13 inserted from the under side of the fender 6 through suitable apertures 14 in the fender and thence into the plate from the inner side thereof so as to leave the outer surface of the plate completely devoid of apertures, bolt or screw heads, or other securing means which would otherwise mar the plated or polished external surface. For cooperation with the screws or bolts 13 the plate is formed on its inner side with a plurality of, herein three, frusto-conical bosses 15 which are drilled and internally threaded to receive the screws or bolts 13. These bosses are made shorter than the distance from the inner face of the plate to the imaginary surface formed by straight lines connecting the leading and trailing peripheral edges. The advantage of such a construction will readily be apparent for it gives the plate a resilient, tensioned mounting. It will be seen that with the peripheral edge contacting the fender but with the outermost ends of the conical bosses 15 spaced from the fender, tightening of the securing screws 13 will tend to place the fender under tension drawing it in at the screws 13 and holding it out at the peripheral edge 10. In this way the peripheral edge of the plate will, throughout its circumference, fit tightly against the fender rather than being spaced from the fender as would be the case with a conventional plate which is not hollow. Thus the appearance is enhanced as is also the reduction of noises due to high velocity air entering between the plate and the fender. The resilient mounting of the plate serves to lessen and, in fact, substantially eliminates any rattling noises due to vibration and, generally, more securely retains the guard on the fender.

The plate is customarily a cast member of suitable metal or of a synthetic polymer which is either subsequently plated or is burnished or polished to give it a smooth, shiny and reflecting surface. With the member cast, it is, of course, a simple matter to obtain the hollow or recessed construction and at the same time provide the bosses 15 and form the external leading edge 16 of the plate with a gently rolled contour (best seen in Fig. 3).

I claim as my invention:

1. A guard to be mounted on a cycle fender comprising a generally elongated member having an intermediate portion adapted to extend generally transversely of a fender on which the guard is to be mounted and end portions extending generally laterally of the intermediate portion, at least said intermediate portion having on its inner side protruding peripheral edges for engagement with the fender, and a plurality of bosses projecting from the inner side and terminating short of an imaginary surface formed by joining said peripheral edges with straight lines, said bosses being threaded for engagement with screws passed through the fender.

2. A guard to be mounted on a cycle fender comprising a generally elongated member having an intermediate portion adapted to extend generally transversely of a fender on which the guard is to be mounted and wing-like end portions extending generally laterally of the intermediate portion, said intermediate portion having a nonuniform V-shaped transverse cross section with one branch of the V narrower than the other and adapted to be disposed generally perpendicular to the fender and the other branch of the V sloping from the juncture of the two branches obliquely inwardly toward the fender, said end portions being formed from a continuation of the narrower branch of the V curving around to extend laterally of the intermediate portion and tapering to an end, and the wider branch of the V similarly curving around to extend generally laterally of the intermediate portion, the end portions being slightly recessed to form, in conjunction with the V-shape of the intermediate portion, projecting peripheral edges throughout the entire periphery of said member, and a plurality of bosses formed on the inner side of said member for the reception of screws utilized in securing said member to the fender, said bosses terminating short of the surface defined by the projecting peripheral edges so as to permit said plate to be drawn with its peripheral edges bearing on the fender while said bosses remain out of contact with the fender.

3. A guard to be mounted on a cycle fender comprising a generally elongated member having an intermediate portion adapted to extend generally transversely of a fender on which the guard is to be mounted and end portions extending generally laterally of the intermediate portion and parallel with the circumferential edges of the fender, said member having a leading edge which is rounded in transverse cross section, a scalloped trailing edge formed by the lateral end portions and a central and transversely extending rib which becomes progressively pronounced from the leading to the trailing edge of said member, said member on its inner side being recessed to have projecting peripheral edges for engagement with the fender to the exclusion of the remainder of said member, and means for securing said member to the fender adapted to engage the fender within the area defined by the peripheral edges of said member and to engage said member within the recessed inner side and only on the inner side.

GORDON A. WILLEY.

(References on following page)

REFERENCES CITED

The following references are of record in the file of this patent:

UNITED STATES PATENTS

| Number | Name | Date |
|---|---|---|
| D. 102,374 | Kraeft | Dec. 15, 1936 |
| D. 129,102 | Comiskey | Aug. 26, 1941 |
| 511,996 | Bunker | Jan. 2, 1894 |
| 1,939,604 | Bronson | Dec. 12, 1933 |
| 2,023,079 | Jandus et al. | Dec. 3, 1935 |

FOREIGN PATENTS

| Number | Country | Date |
|---|---|---|
| 432,929 | Great Britain | Aug. 6, 1935 |